United States Patent Office 2,867,648
Patented Jan. 6, 1959

2,867,648

PROCESS OF PRODUCING TURPENTINE-UNSATURATED DICARBOXYLIC ESTER ADDUCTS

Joachim Dazzi, Dayton, Ohio, assignor to Monsanto Chemical Company, St. Louis, Mo., a corporation of Delaware No Drawing. Application July 21, 1955
Serial No. 523,609

5 Claims. (Cl. 260—468)

The present invention relates to adducts of turpentine and esters of dicarboxylic acids and more particularly provides new and highly valuable high-boiling turpentine addition products having a plurality of carboxylate radicals, a method of preparing the same, and resinous compounds comprising vinyl chloride polymers plasticized with said addition products.

According to the invention, highly valuable viscous stable addition products are prepared by heating turpentine with an appropriate fumarate or maleate at a temperature of from 150° C. to 280° C. in the presence of a polymerization inhibitor and recovering from the resulting reaction product a material which boils substantially above the boiling point of a monomeric Diels-Alder 1:1 adduct of turpentine and said fumarate or maleate. The recovered material comprises the present addition products. While the chemical structure of the present addition products has not been precisely determined, analytical data and molecular weight determination indicate the presence of dimeric Diels-Alder turpentine-fumarate or maleate adducts. Owing to the uncertainty of the structure, the present turpentine-fumarate or maleate reaction products will be hereinafter referred to as polycarboxylate-containing turpentine-fumarate or turpentine-maleate adducts having a boiling point which is above that of said monomeric Diels-Alder 1:1 adducts.

Fumarates or maleates which react with turpentine to give the present addition products have the formula

in which Y and Y' are selected from the class consisting of alkyl and alkoxyalkyl radicals of from 1 to 8 carbon atoms. This formula includes the simple alkyl fumarates or maleates, the simple alkoxyalkyl fumarates or maleates, mixed alkyl fumarates or maleates, mixed alkoxyalkyl fumarates or maleates, and alkyl alkoxyalkyl fumarates or maleates. Fumarates and maleates of the above formula and useful for the present purpose are, for example, the simple esters such as methyl fumarate, ethyl fumarate, n-propyl maleate, isopropyl fumarate, n-butyl maleate, tert-amyl fumarate, n-hexyl fumarate, n-heptyl maleate, 2-ethylhexyl fumarate, n-octyl fumarate, bis(2-methoxyethyl) and bis(2-ethoxyethyl) fumarate or maleate, bis(3-ethoxy-n-propyl) fumarate or maleate, bis(4-butoxybutyl) fumarate or maleate, 3-propoxypropyl 2-ethoxyethyl fumarate or maleate, methoxymethyl 2-amyloxyethyl fumarate or maleate, ethyl n-propyl fumarate or maleate, ethyl isobutyl fumarate or maleate, amyl 2-ethylhexyl fumarate or maleate, ethyl 2-ethoxyethyl fumarate or maleate, n-butyl 3-propoxypropyl fumarate or maleate, etc.

Reaction of turpentine with the above fumarates or maleates to form the present high boiling polycarboxylate-containing adducts takes place readily by heating the turpentine with the ester in the presence of a polymerization inhibitor at ordinary or superatmospheric pressures. When operating at atmospheric pressure, temperatures of from, say, 150° C. to 300° C., and preferably of from 200° C. to 280° C., are used. Inhibitors of polymerization which may be employed are, e. g., hydroquinone, tert-butylcatechol, pyrogallol, p-aminophenol, etc. They are preferably present in small concentrations, i. e., in concentrations of from, say, 0.5 percent to 5.0 percent by weight of the reactants. Since the presently useful fumarates are generally miscible with the turpentine under the reaction conditions, no extraneous solvent or diluent usually need be employed. For successful reaction, an inert diluent may or may not be present. The reaction time may vary from, say, a few minutes to 24 hours, a reaction time of, say, from 2 to 12 hours being recommended when it is desired to obtain good yields of the desired product. Progress of the reaction may be readily followed by noting viscosity or refractive index changes in the reaction mixture.

Because the rate at which formation of the present high boiling addition products occurs varies with the nature of the individual ester and the temperature conditions, it is recommended that for each initial run there be experimentally determined the operating conditions which should be observed for the formation of a crude reaction mixture comprising the present high-boiling polycarboxylate adducts. Upon distilling said crude reaction mixture to remove any material which boils at or below the boiling point of the 1:1 Diels-Alder turpentine-fumarate or maleate adducts, any unreacted turpentine and ester as well as the monomeric 1:1 Diels-Alder adduct is removed.

The residue from this distillation may conceivably comprise polymeric esters, polymeric terpenic constituents of the turpentine, adducts of turpentine and ester in a ratio different than the 1:1 ratio of the monomeric Diels-Alder adduct, and polymeric 1:1 Diels-Alder adducts. The presence of a polymerization inhibitor and the analysis of the residue for carbon and hydrogen content exclude the presence of any substantial terpene or fumarate or maleate polymer or greater than 1:1 turpentine-ester Diels-Alder adduct. On the other hand, the high boiling point, the high refractive index and the molecular weight of the residue substantially excludes the presence of the initial reactants or of said monomeric adduct. Since elemental analysis and saponification values of the residue corresponds to said Diels-Alder adduct, the residue is thus believed to consist chiefly of an addition compound in which one mole of the monomeric 1:1 adduct has added to another mole of the same.

Turpentine-fumarate or turpentine-maleate adducts having boiling points which are substantially above those of corresponding monomeric Diels-Alder adducts are stable, polycarboxylate-containing materials which, depending on the nature of the individual fumarate or maleate employed, range from highly viscous to semi-solid or waxy materials. They are advantageously employed for a variety of industrial purposes, for example, as thickening agents in the preparation of emollients, greases, as intermediates for the preparation of surfactants, etc. They are particularly valuable as plasticizers for vinyl chloride polymers, having the property of increasing the flexibility characteristics of such polymers without adversely affecting the heat resistance thereof.

The present invention is further illustrated, but not limited, by the following examples:

Example 1

A mixture consisting of 388 grams (1.7 moles) of butyl fumarate, 462 grams of wood turpentine and 1.0 grams of di-tert-butyl-catechol was heated for 12 hours in a rocking bomb (no pressure) at a temperature of 220° C. The refractive index of the reaction mixture rose from $n^{25}_D$ 1.4573 to $n^{25}_D$ 1.4720 during the heating. Fractional distillation of the resulting reaction mixture to remove material boiling below 200° C./0.6 mm. (pot temperature 220–240° C.) gave as residue 205 grams of a highly viscous product, $n^{25}_D$ 1.4805, analyzing 69.38 percent carbon and 9.4 percent hydrogen as against 72.5 percent carbon and 9.9 percent hydrogen, the calculated value for a 1:1 Diels-Alder ($C_{22}H_{36}O_4$) turpentine-butyl fumarate adduct, based on 100 percent terpene content of the turpentine. The residue was found to have a saponification equivalent of 172.1 and 173.1 in two different determinations, as compared to 182, the calculated saponification equivalent of said Diels-Alder adduct. Molecular weight determination of the residue, conducted by the freezing point method in camphor, was found to be 564 as against 364, the molecular weight of said Diels-Alder adduct. Because the carbon, hydrogen and saponification values of the residue agree closely with those of said Diels-Alder adduct, whereas the molecular weight of the residue, its boiling point, and its refractive index are very high, the residue is believed to consist chiefly of the dimeric Diels-Alder adduct.

*Example 2*

A mixture consisting of 388 grams (1.7 moles) of n-butyl maleate, 462 grams of wood turpentine and 1 gram of di-tert-butyl-catechol was heated, with agitation, in a closed stainless steel vessel at a temperature of 220° C. for 12 hours. The refractive index of the reaction mixture rose from $n^{25}_D$ 1.4578 to $n^{25}_D$ 1.4704 during the heating. Distillation of the resulting reaction mixture to remove material boiling below 230° C. gave as residue 95.4 grams of product, $n^{25}_D$ 1.4819, analyzing 70.82 percent carbon and 9.58 percent hydrogen and having a saponification number of 183.3 and 184.1 in two different determinations. These values, compared with 72.5%, 9.9% and 182, the carbon, hydrogen and saponification equivalent values, respectively, of a Diels-Alder turpentine-butyl maleate adduct, together with the high boiling point and the high refractive index of the residue, indicate the present residue to consist chiefly of the dimetric turpentine-butyl maleate Diels-Alder adduct.

*Example 3*

This example is like Example 1, except that instead of using wood turpentine there was employed "sulfate" turpentine, i. e., a turpentine obtained as a by-product in the paper pulp industry. The crude sulfate turpentine was distilled to give a fraction, B. P. 160–166° C., and 388 grams (1.7 moles, based on pinene) was heated in a rocking bomb with 462 grams (3.4 moles) of butyl fumarate for 12 hours at 220° C. Distillation of the resulting reaction product to remove material boiling below 190° C./0.7–1.2 mm. (pot temperature, 200–220° C.) gave as residue 210 grams of adduct having a refractive index of $n^{25}_D$ 1.4750 as against $n^{25}_D$ 1.4587 of the initial, unheated mixture of the fumarate and said sulfate turpentine fraction. The residue analyzed 69.92 percent carbon and 9.57 percent hydrogen, which values correspond very closely to those of the residue obtained in Example 1. The present residue had a saponification equivalent of 175.6.

*Example 4*

This example shows testing of the distillation residues of Example 1 as plasticizers for polyvinyl chloride.

Sixty parts of polyvinyl chloride and forty parts by weight of the said residue were mixed on a rolling mill to a homogeneous blend. During the milling there was observed substantially no fuming and discoloration. A molded sheet of the mixture was clear, transparent, and substantially colorless. Testing of the molded sheet for low temperature flexibility, according to the Clash-Berg method, gave a value of minus 3.2° C. Tests on the volatility characteristics of the plasticized composition employing the carbon absorption method of the Society of the Plastics Industry gave a value of 1.4 percent which showed excellent retention of plasticizer and indicated good temperature characteristics of the composition. The plasticized material had a water-absorption value of 0.44 percent after immersion in water for 24 hours, and a solids loss value of 0.00 after such immersion. When subjected to heat at a temperature of 325° F. for a period of 30 minutes, the clarity and color of the molded sheet were substantially unchanged.

The kerosene resistance of the residue of Example 1 was tested as follows: 60 parts by weight of polyvinyl chloride and 40 parts by weight of said residue were milled together to a homogeneous blend. Molded test specimens were prepared therefrom, said specimens being circles having a diameter of two inches and thickness of 2 mm. The test specimens were immersed in kerosene for 24 hours at a temperature of 50° C., wiped dry, and then oven-dried at 50° C. for 44 hours. The dried specimens showed a weight change of minus 0.2 percent as compared to the initial weight thereof.

This substantial non-extractibility of the present residue by kerosene from polyvinyl chloride resins plasticized by the same is remarkable in that commonly-employed plasticizers are readily extracted when submitted to the same test. Thus, like-dimensioned molded test specimens of a milled blend consisting of 60 percent polyvinyl chloride and 40 percent dioctyl phthalate suffered a weight loss of 76.7 percent of the phthalate when submitted to the same test.

*Example 5*

When the residue of Example 2, i. e., that obtained from turpentine and butyl maleate, was subjected to the testing procedures of Example 4, there was obtained a Clash-Berg flexibility value of 5° C., a volatility value of 0.6 percent and a kerosene extraction value of 2 percent. The plasticized product was clear and transparent.

Instead of the high-boiling adducts of turpentine and butyl fumarate or butyl maleate, likewise useful as polyvinyl chloride plasticizers are residues obtained by heating turpentine with other fumarates or maleates and removing material boiling at or below the 1:1 Diels-Alder adducts. Thus, by employing 40 parts by weight of such residue obtained from turpentine and methyl, n-octyl, 2-butoxyethyl or 3-methoxypropyl ethyl fumarate or maleate, or ethyl propyl, amyl 2-ethylhexyl or butyl 2-ethoxyethyl fumarate or maleate with 60 parts by weight of polyvinyl chloride or with 60 parts by weight of a vinyl chloride-vinyl acetate copolymer known to the trade as "Vinylite," there are obtained clear, colorless compositions of very good flexibility and stability.

While the above examples show only a composition in which the ratio of plasticizer to polymer content is 40:60, the content of adduct to polyvinyl chloride may be widely varied, depending upon the properties desired in the final product. For many purposes, a plasticizer content of, say, from only 10 percent to 20 percent is preferred.

Although the invention has been described particularly with reference to the use of the present adduct as plasticizers for polyvinyl chloride, these high-boiling polycarboxylates are advantageously employed also as plasticizers for copolymers of vinyl chloride, for example, the copolymers of vinyl chloride with vinyl fluoride, vinylidene chlorofluoride, vinylidene chloride, methyl methacrylate, acrylonitrile, etc. Preferably, such copolymers have a high vinyl chloride content, i. e., a vinyl chloride content of at least 70 percent of vinyl chloride and up to 30 percent by weight of a copolymerizable monomer.

The plasticized polyvinyl halide compositions of the present invention have good thermal stability; however, for many purposes it may be advantageous to use known stabilizers in the plasticized compositions. Also, while the present high-boiling adducts are of general utility in softening vinyl chloride polymers, they may be used as the only plasticizing component in a compounded vinyl chloride polymer, or they may be used in conjunction with other plasticizers.

What is claimed is:
1. The method which comprises heating turpentine with an ester having the formula

YOOCCH:CHCOOY' in which Y and Y' are alkyl radicals of from 1 to 8 carbon atoms, at a temperature of from 150–280° C., in the presence of an inhibitor of polymerization, removing from the resulting reaction product material boiling up to and at the boiling point of a monomeric Diels-Alder 1:1 adduct of turpentine and said ester, and obtaining as residue a high-boiling polycarboxylate-containing addition product of turpentine with said ester.

2. The method which comprises heating turpentine with an alkyl fumarate of from 1 to 8 carbon atoms in the alkyl radical, at a temperature of from 150–280° C., in the presence of an inhibitor of polymerization, removing from the resulting reaction product material boiling up to and at the boiling point of a monomeric Diels-Alder 1:1 adduct of turpentine and said fumarate, and obtaining as residue a high-boiling polycarboxylate-containing addition product of turpentine with said fumarate.

3. The method which comprises heating turpentine with an alkyl maleate of from 1 to 8 carbon atoms in the alkyl radical, at a temperature of from 150–280° C., in the presence of an inhibitor of polymerization, removing from the resulting reaction product material boiling up to and at the boiling point of a monomeric Diels-Alder 1:1 adduct of turpentine and said maleate, and obtaining as residue a high-boiling polycarboxylate-containing addition product of turpentine with said maleate.

4. The method which comprises heating turpentine with butyl fumarate at a temperature of from 150–280° C., in the presence of an inhibitor of polymerization, removing from the resulting reaction product material boiling up to and at the boiling point of a monomeric Diels-Alder 1:1 adduct of turpentine and said fumarate, and obtaining as residue a high-boiling polycarboxylate-containing addition product of turpentine with said fumarate.

5. The method which comprises heating turpentine with butyl maleate at a temperature of 150–280° C., in the presence of an inhibitor of polymerization, removing from the resulting reaction product material boiling up to and at the boiling point of a monomeric Diels-Alder 1:1 adduct of turpentine and said maleate, and obtaining as residue a high-boiling polycarboxylate-containing addition product of turpentine with said maleate.

References Cited in the file of this patent

UNITED STATES PATENTS

| | | |
|---|---|---|
| 2,045,393 | Kollek et al. | June 23, 1936 |
| 2,201,395 | Fletcher | May 21, 1940 |
| 2,234,958 | Bradley et al. | Mar. 18, 1941 |
| 2,235,447 | Bradley et al. | Mar. 18, 1941 |
| 2,237,356 | Merrill | Apr. 8, 1941 |
| 2,345,948 | Pellett | Apr. 4, 1944 |
| 2,403,038 | Aelony | July 2, 1946 |
| 2,407,937 | Rummelsburg | Sept. 17, 1946 |